US009969029B2

(12) United States Patent
Rominger et al.

(10) Patent No.: US 9,969,029 B2
(45) Date of Patent: May 15, 2018

(54) LASER PROCESSING HEAD AND ANNULAR NOZZLE FOR A LASER PROCESSING HEAD

(71) Applicant: TRUMPF LASER GMBH, Schramberg (DE)

(72) Inventors: Volker Rominger, Stuttgart (DE); Gerhard Broghammer, Boesingen (DE)

(73) Assignee: TRUMPF LASER GMBH, Schramberg (DE)

( * ) Notice: Subject to any disclaimer, the term of this patent is extended or adjusted under 35 U.S.C. 154(b) by 43 days.

(21) Appl. No.: 14/664,113

(22) Filed: Mar. 20, 2015

(65) Prior Publication Data
US 2015/0196974 A1    Jul. 16, 2015

Related U.S. Application Data

(63) Continuation of application No. PCT/EP2013/002818, filed on Sep. 19, 2013.

(30) Foreign Application Priority Data

Sep. 21, 2012  (DE) .......................... 10 2012 217 082

(51) Int. Cl.
*B23K 26/00* (2014.01)
*B23K 26/02* (2014.01)
(Continued)

(52) U.S. Cl.
CPC .......... *B23K 26/147* (2013.01); *B23K 26/142* (2015.10); *B23K 26/1438* (2015.10); *B23K 26/1462* (2015.10)

(58) Field of Classification Search
USPC .... 219/651, 683, 686, 707, 50–58, 59.1–67, 219/68–70, 71–75, 76.1–77, 78.01–120,
(Continued)

(56) References Cited

U.S. PATENT DOCUMENTS 4,127,761 A * 11/1978 Pauley ............... B23K 26/1464
219/121.63
4,528,436 A * 7/1985 Stol ..................... B23K 9/0282
219/59.1
(Continued)

FOREIGN PATENT DOCUMENTS

CN  102672351 A  11/2015
DE  3801068 A1   7/1989
(Continued)

OTHER PUBLICATIONS

Kamimuki et al., "Prevention of welding defect by side gas flow and its monitoring method in continuous wave Nd: YAG laser welding", Journal of Laser Applications, vol. 14, No. 3, Aug. 2002, 10 pages.
(Continued)

*Primary Examiner* — David Angwin
*Assistant Examiner* — Gyounghyun Bae
(74) *Attorney, Agent, or Firm* — Fish & Richardson P.C.

(57) ABSTRACT

A laser processing head comprises an optical focusing unit for focusing a laser beam on a processing zone of a workpiece and an annular nozzle arranged coaxially with respect to a central axis of the laser beam for introducing an auxiliary gas into a region surrounding the processing zone. The annular nozzle is mounted on the laser processing head so as to be displaceable along the laser beam axis and can be secured to the laser processing head in different positions along the laser beam axis.

15 Claims, 2 Drawing Sheets

(51) Int. Cl.
  *B23K 26/12* (2014.01)
  *B23K 26/14* (2014.01)
  *B23K 26/142* (2014.01)

(58) Field of Classification Search
  USPC ............ 219/121.11–144, 148–154, 200–270, 219/383–553
  See application file for complete search history.

(56) References Cited

U.S. PATENT DOCUMENTS

| | | | | |
|---|---|---|---|---|
| 5,039,837 | A * | 8/1991 | Nourbakhsh | H05H 1/34 219/121.48 |
| 5,110,052 | A * | 5/1992 | Graf | B05B 7/0416 239/333 |
| 5,144,110 | A * | 9/1992 | Marantz | H05H 1/42 219/121.47 |
| 5,293,023 | A * | 3/1994 | Haruta | B23K 26/142 219/121.6 |
| 5,424,508 | A * | 6/1995 | Swain | B23K 26/1438 216/65 |
| 5,477,026 | A * | 12/1995 | Buongiorno | B23K 26/144 219/121.64 |
| 5,705,785 | A * | 1/1998 | Dykhno | B23K 26/1429 219/121.45 |
| 5,837,960 | A * | 11/1998 | Lewis | B23K 26/34 219/121.63 |
| 5,915,316 | A | 6/1999 | Tajima et al. | |
| 6,388,227 | B1 * | 5/2002 | Dykhno | B23K 26/1429 219/121.45 |
| 6,600,133 | B2 * | 7/2003 | Watanabe | B23K 9/0043 219/121.63 |
| 8,866,040 | B2 | 10/2014 | Ko et al. | |
| 2004/0099643 | A1 * | 5/2004 | Fabbro | B23K 26/147 219/121.63 |
| 2004/0124270 | A1 * | 7/2004 | Zhou | B01J 2/04 239/399 |
| 2004/0169021 | A1 * | 9/2004 | Baker | B23K 26/0096 219/121.63 |
| 2006/0102600 | A1 * | 5/2006 | Schafer | B23K 26/0648 219/121.64 |
| 2009/0084765 | A1 * | 4/2009 | Muratsubaki | B23K 26/146 219/121.67 |
| 2009/0134132 | A1 | 5/2009 | Verna et al. | |
| 2010/0187209 | A1 * | 7/2010 | Miyazaki | B23K 26/1476 219/121.84 |
| 2012/0080413 | A1 * | 4/2012 | Kishino | B23K 26/0807 219/121.63 |
| 2013/0015168 | A1 * | 1/2013 | Nagahori | B23K 26/14 219/121.72 |
| 2013/0233836 | A1 * | 9/2013 | Dackson | B23K 26/1476 219/121.64 |

FOREIGN PATENT DOCUMENTS

| | | | |
|---|---|---|---|
| DE | 10160785 | C1 | 8/2003 |
| DE | 202004017854 | U1 | 1/2005 |
| DE | 102004031881 | A1 | 1/2006 |
| DE | 202005016574 | U1 | 2/2007 |
| DE | 102006043693 | | 3/2008 |
| DE | 102006045554 | | 4/2008 |
| EP | 0458181 | A2 | 11/1991 |
| EP | 0985484 | A2 | 3/2000 |
| GB | 1477710 | | 6/1977 |
| JP | 63056389 | A * | 3/1988 ............ B23K 26/14 |
| JP | 11104879 | A * | 4/1999 ............ B23K 26/14 |
| WO | WO0138038 | A2 | 5/2001 |

OTHER PUBLICATIONS

Oiwa et al., "Optical Properties of Laser-Induced Plume during High Power Laser Welding", In: 28th International Congress on Applications of Laser & Electro-Optics ICALEO, Orlando, Florida: Nov. 2-5, 2009, pp. 359-365.

* cited by examiner

LASER PROCESSING HEAD AND ANNULAR NOZZLE FOR A LASER PROCESSING HEAD

CROSS-REFERENCE TO RELATED APPLICATIONS

This application is a continuation of and claims priority under 35 U.S.C. § 120 to PCT Application No. PCT/EP2013/002818 filed on Sep. 19, 2013, which claimed priority to German Application No. DE 10 2012 217 082.0, filed on Sep. 21, 2012. The contents of both of these priority applications are hereby incorporated by reference in their entirety.

TECHNICAL FIELD

The invention relates to laser processing heads and an annular nozzle for laser processing heads for introducing an auxiliary gas into a region surrounding the processing zone of the workpiece.

BACKGROUND

When laser welding workpieces, a so-called capillary is formed in the processing zone of the workpiece in which the workpiece is melted locally. From the capillary or a melt bath surrounding the capillary there is discharged metal vapor that rises in the form of small particles in a region surrounding the processing zone caused by to the continuously high energy coupling resulting from the laser beam. A portion of the laser radiation produced by the laser processing head is absorbed by the metal vapor particles, whereby they become heated and, owing to the very high temperature thereof, transmit heat radiation. That is to say, a so-called metal vapor plume is produced.

The spatial form or the extent of the metal vapor plume during the processing operation can vary greatly in terms of time and location. Accordingly, the temperature in the surrounding medium changes and consequently the refractive index changes in terms of time and location to an equally great extent so that there is formed a so-called thermal lens, which brings about a redirection of the laser radiation with high temporal dynamics. The temporally and locally non-homogeneous energy coupling which is thereby brought about in the workpiece typically has a negative effect on the quality of the workpiece processing. This interaction causes weld splashes, weld seam fluctuations in the form of irregular upper seam beads, and/or generally impaired seam geometry.

The formation of a metal vapor plume (but also the propagation of weld gases, smoke, etc.) further involves the problem that the rising metal vapor or the particles contained in the rising weld gases can become increasingly deposited on the laser processing head (for example, on the optical focusing unit). This deposition may lead to impairment of the operation of the laser processing head, for example, by a thermally induced focal point displacement. This danger is particularly evident as a result of metal splashes that occur during the laser processing operation and that are thrown in an uncontrolled manner from the melt of the capillary in the direction of the laser processing head (e.g., the optical focusing unit).

To achieve an improved process result (for example, a better seam quality), it is known from DE 20 2004 017 854 U1 to reduce the interaction of the laser radiation with the metal vapor plume. This reduction is achieved by a region of the focused laser beam located below an optical processing unit being kept free of a mixture of welding gases and warm ambient air to the greatest possible extent by at least one gas flow being directed onto the focused laser beam and passing through the laser beam. To this end, the gas flow can be directed in an oblique manner onto the processing zone and/or in an oblique manner onto a region in front of the processing zone on the workpiece. The gas flow or the gas flows is/are produced by one or more gas nozzles, for example, by an annular nozzle which is arranged coaxially with respect to the laser beam.

To protect the laser processing head or the optical focusing unit (and the above-described gas nozzles or the coaxial nozzle) from metal splashes, DE 20 2004 017 854 U1 also describes introducing a comparatively powerful transverse air flow (cross jet) that is oriented transversely relative to the incident laser beam, is arranged close to the optical unit, and detects and redirects any potential occurrences of metal splashes before they reach and potentially damage the laser processing head or the optical focusing unit.

To minimize the thermal lens effect described above, the cross jet has to be moved as close as possible to the workpiece. This results, on the one hand, in the problem of an interference contour. On the other hand, if the gas nozzles(s) which is/are used are arranged comparatively close to the processing zone of the workpiece, it/they can become relatively easily contaminated by the rising metal vapor (or the metal vapor plume) or by metal splashes thrown from the melt. From a specific degree of contamination, an interruption of the laser operation to clean or to replace the gas nozzle(s) is required to ensure their operation and to prevent impairment of the seam quality. In addition, metal vapor can flow around the cross jet, whereby the contamination already described above as a result of metal splashes may again occur above the cross jet. If the cross jet is blown into the melt bath, the seam quality may be influenced in a negative manner.

US 2009/0134132 A1 further discloses a coaxial nozzle through which is discharged a first rapid gas flow during the laser welding operation, which produces a dynamic gas pressure on a capillary formed on the workpiece so that the capillary remains open and the hydrodynamics of the melt bath is stabilized to prevent the ejection of metal splashes in the direction of the laser processing head. A second slow gas flow which surrounds the first gas flow serves to prevent the contact of the melt with the oxygen of the ambient air.

SUMMARY

The present disclosure relates to laser processing heads that include an annular nozzle mounted on the laser processing head to be displaceable along a laser beam axis and to be secureable to the laser processing head in different positions along the laser beam axis. During displacement, the annular nozzle typically remains oriented coaxially with respect to the laser beam axis, that is to say, the rotation axis of the annular nozzle coincides with the laser beam axis during laser operation of the laser processing head.

Advantages of the embodiments described herein include improved laser processing heads that reduce the consumption of gas needed to limit metal vapor plumes. Other advantages include an increase in flexibility when handling the annular nozzle.

It is also possible to adapt the volume flow required to displace the metal vapor plume out of the beam path of the laser radiation in accordance with the requirements of the respective processing situation (for example, different operating spacing between the workpiece and the laser processing head). This is achieved by the ability to reposition the annular nozzle relative to the housing of the processing head, in which the optical focusing unit is arranged, along the laser beam axis in different positions, and secure it to the housing or a housing portion. The displaceability of the annular nozzle along the laser beam axis advantageously enables a position of the annular nozzle to be selected in which the volume flow required to displace the metal vapor plume out of the beam path of the laser radiation is minimized. A suitable position of the annular nozzle along the laser beam axis, in which the smallest possible volume flow is required to effectively suppress the metal vapor plume, can be determined for predetermined processing parameters (operating spacing with respect to the workpiece or focal distance of the optical focusing unit, advance speed, type of workpiece processed, etc.) experimentally or using flow simulations. The corresponding information may, for example, be stored in a database that an operator or optionally a control device of a laser processing machine can access to move the annular nozzle into a suitable position and to secure it at that location.

Due to the height adjustability of the annular nozzle, the active region thereof, that is to say, the region in which the auxiliary gas that is discharged from the annular nozzle displaces the welding gases (or the metal vapor plume), which occur during the laser processing operation of the workpiece, can further be adapted in a selective manner specific to the situation. The ability to use the laser processing head is consequently significantly improved by the height adjustability of the annular nozzle. Thus, more flexible handling of the laser processing head in different processing situations is possible (e.g., varying operating spacing, focal lengths, and advance speeds).

In some embodiments, the annular nozzle is rigidly connected to a tubular portion of a supply line for the auxiliary gas, wherein the tubular portion extends in the direction of the laser beam axis. Due to the rigid connection of the (rigid) tubular portion of the supply line with respect to the annular nozzle, the handling of the annular nozzle is simplified (e.g., the adjustment of different distances with respect to the optical focusing unit or the workpiece to be processed). Due to the rigid connection, the coaxial orientation of the annular nozzle with respect to the laser processing head or the laser beam axis can be maintained. The supply for the auxiliary gas, which is directed over the tubular portion, can be connected to the annular nozzle in a gas-tight manner, for example, by an adapter that brings about a redirection of the auxiliary gas flow out of the tubular portion, e.g., through approximately 90°, and consequently enables a supply of the auxiliary gas via a lateral inlet opening of the annular nozzle.

In further embodiments, the tubular portion is displaceably supported on the laser processing head. Due to the displaceable support of the tubular portion to which the annular nozzle is rigidly connected, particularly simple and efficient displaceability of the annular nozzle can be achieved. It is advantageously possible to dispense with the need for additional bearing mechanisms, such as, for example, additional guides or the like. Instead, a portion of the supply line used for the operation of the annular nozzle is advantageously constructed in a tubular (rigid) manner so that the portion itself contributes towards producing the displaceable support of the annular nozzle. The tubular portion may optionally be displaced by a controllable drive, for example, by a linear drive along the laser processing head (parallel to the laser beam axis) and secured or positioned in different positions to bring about an automated displacement of the annular nozzle.

Typically, the laser processing head can further include a clamping device for securing the tubular portion to the laser processing head in a clamped manner. In this manner, securing the annular nozzle with the desired spacing with respect to the optical focusing unit or to the workpiece can be achieved in a simple manner. The clamping device is typically actuated by an operator, but it is also optionally possible to carry out the clamping of the tubular portion in an automated manner. To simplify the securing in a desired position along the laser beam axis, markings or a scale may be provided on the laser processing head, more specifically on the housing portion which is used for guiding.

In another embodiment, the annular nozzle has at least one outlet opening, e.g., a plurality of outlet openings, which is/are each oriented at an angle (typically of the same degree) relative to the laser beam axis. In a plane perpendicular to the laser beam axis, the outlet openings are oriented with respect to the rotation axis of the annular nozzle in a radial direction which corresponds to the laser beam axis. The outlet openings are distributed in a peripheral direction typically with regular spacing along the annular nozzle. The beam path of the laser beam can penetrate the auxiliary gas in a uniform manner due to the plurality of outlet openings. This consequently displaces in a uniform manner the metal vapor plume that occurs from the spatial region close to the workpiece or out of the beam path of the laser beam. The smallest volume flow to suppress the metal vapor plume is generally required when the annular nozzle is arranged with an operational spacing at which the longitudinal axes of the outlet openings intersect on the workpiece.

It has been found to be advantageous for the longitudinal axes of the outlet (nozzle) openings, which may be constructed, for example, as holes, to be oriented substantially parallel to the conical covering face of the focused laser beam. Since the focal length of the optical focusing unit of the laser processing head can be changed where applicable in accordance with the processing parameters, it may be advantageous for the orientation of the outlet openings, more specifically the angle with respect to the laser beam axis, to be adapted accordingly. It is thereby possible to achieve particularly high-quality processing results (for example, particularly uniform seam geometries on the workpiece).

In further embodiments, an annular nozzle includes a first annular portion, a second annular portion, and a changing ring, which are releasably connected to each other and which together delimit an annular gas distribution chamber, there being formed on at least one annular portion at least one inlet opening that opens in the gas distribution chamber to connect a supply line for the auxiliary gas and there being formed in the changing ring at least one outlet opening for the auxiliary gas. The provision of a single outlet opening in the changing ring may be advantageous for the welding of linear seams. The annular nozzle can be supported on the laser processing head so as to be able to be displaced along the laser beam axis and may be able to be secured in different positions along the laser beam. However, it is also possible to support the annular nozzle without any possibility of displacement on the laser processing head. In this instance, for example, one of the annular portions can be rigidly connected to the laser processing head. By releasing the connection to the other annular portion, a replacement of the changing ring is also possible in this instance.

The advantage connected with the annular nozzle is, inter alia, that the multi-component nature of the annular nozzle enables easy and rapid handling of the changing ring. The changing ring can consequently, in the event of a (where applicable only partial) closure of the at least one outlet opening by metal splashes or deposited metal vapor, be readily removed and replaced with a new changing ring without the entire annular nozzle having to be replaced. To exchange the changing ring it is also not necessary to remove the auxiliary gas supply that is connected to the annular nozzle from the annular nozzle. In place of a replacement, the changing ring can also be removed in a simple manner, cleaned, and subsequently reinserted into the annular nozzle.

Furthermore, it is advantageously possible to use another type of changing ring due to the rapid and easy replaceability of the changing ring, depending on the processing spacing between the laser processing head and workpiece, or depending on the focal point which is currently adjusted. It is also possible to use changing rings in which the respective orientation of the at least one outlet opening differ from each other, e.g., the values of the angles at which the outlet openings are oriented with respect to the laser beam axis can differ. Since the longitudinal axes of the outlet opening(s) or holes are intended to be oriented substantially in parallel with the conical covering face of the focused laser beam, the selection of a suitable angle for the orientation is dependent on the focal length of the laser beam. The length influences the opening angle of the conical covering face of the focused laser beam.

It is also possible where applicable to use several types of changing ring with a different (inner) geometry of the outlet opening(s) and/or with a different number of outlet openings. Due to the possibility of influencing the flow configuration in the region close to the processing zone using a plurality of changing rings that are different in each case, an improved process gasification can be achieved, that is to say, an improvement that requires less auxiliary gas, in terms of keeping the space through which the laser beam passes free from welding gases, metal vapors or the metal vapor plume.

In some embodiments, there are formed in the changing ring a plurality of outlet openings for the auxiliary gas, which are typically arranged with regular spacing in a peripheral direction on the changing ring. The outlet openings are consequently typically constructed on the changing ring in a regular pattern (e.g., in a rotationally symmetrical pattern about a rotation axis of the annular nozzle) and bring about a more uniform penetration of the beam path of the laser beam or the environment thereof with the auxiliary gas. In this manner the metal vapor plume which occurs can be efficiently displaced out of the processing region close to the workpiece.

In some embodiments, the at least one outlet opening of the changing ring has a flow cross-section which varies in the longitudinal direction of the outlet opening. The varying flow cross-section brings about a more powerful orientation of the outlet flow compared with holes having a constant diameter, the outlet flow further having a higher outlet speed. The flow cross-section of the outlet openings may, for example, have a convergent/divergent path. Due to an appropriate selection of a varying flow cross-section of the outlet openings in the changing ring, the flow configuration in the region of the processing operation close to the workpiece can be influenced in a selective manner.

In a further embodiment of the annular nozzle, the longitudinal axis of the at least one outlet opening is oriented at an (acute) angle with respect to the rotation axis of the annular nozzle. The angle may be selected in this instance so that the gas flow brought about by the annular nozzle extends substantially parallel to the conical covering face of the focused laser beam, whereby a particularly efficient displacement of the metal vapor plume and consequently particularly efficient prevention of the formation of a thermal lens can be achieved.

In yet another embodiment, the first annular portion and/or the second annular portion and/or the changing ring is/are screwed to each other. Due to the mutual screwing of the first and second annular portion, they can be separated from each other in a particularly simple and rapid manner to exchange or replace the changing ring, and subsequently joined together again, the screwing also enabling a gas-tight connection. The changing ring can be placed between the first and second annular portion and clamped between the two annular portions during screwing. Alternatively, the changing ring can also be screwed to the first and/or the second annular portion. Of course, there are also other possibilities for producing a releasable connection between the first annular portion, the second annular portion and the changing ring, for example, a lock. In all cases described herein, sealing elements can be provided on the annular portions or on the changing ring where applicable to produce a gas-tight gas distribution chamber.

Due to the possibility of adjusting the value of the angle at which the outlet opening(s) are oriented with respect to the laser beam axis, and other geometry parameters of the outlet openings, for example, the effective diameter of the outlet openings, via the selection of the changing ring, it is inter alia possible to adapt the volume flow required for displacing the metal vapor plume out of the beam path of the laser radiation in accordance with the requirements of the respective processing situation (for example, different operating distances between the workpiece and the laser processing head). Due to the selection of the angle at which the outlet openings are oriented with respect to the laser beam axis, the effective region thereof, that is to say, the region in which the auxiliary gas discharged from the annular nozzle displaces the welding gases (or the metal vapor plume) which occurs during the laser processing of the workpiece, can further be adapted in a selective manner specific to the situation.

Other advantages and advantageous configurations of the subject matter of the invention will be appreciated from the description, the claims, and the drawings. The features mentioned above and those set out below may also be used individually per se or together in any combination. The embodiments shown and described are not intended to be understood to be a conclusive listing but instead are merely examples of the invention. The drawings show the subject matter in a highly schematic manner and are not intended to be understood to be drawn to scale.

DETAILED DESCRIPTION

Figure 1:
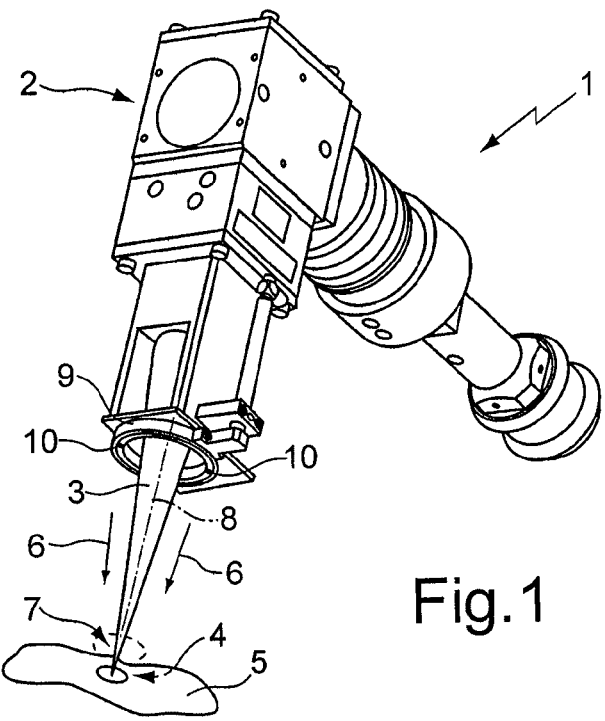
FIG. 1 is a perspective view of an embodiment of a laser processing head.

FIG. 1 shows a laser processing head 1 having an optical focusing unit 2 which is used for focusing a laser beam 3 on a processing zone 4 of a workpiece 5 and which can include a focusing lens and/or a focusing mirror. The optical focusing unit 2 is arranged inside the laser processing head 1 and is therefore not shown in detail in FIG. 1. The workpiece 5 can be processed by the laser beam 3 in a separating manner (e.g., laser cutting, laser removal) or in a joining manner (e.g., laser welding or laser deposition welding), a joining processing operation being described herein.

During laser welding, the workpiece 5 in the processing zone 4 is melted by the laser beam 3 and metal vapor may rise from the workpiece surface in the direction of the laser processing head 1. If no protective measures are taken, portions of the laser radiation 3 are absorbed by the rising metal vapor and are subsequently emitted as heat radiation discharged from the metal vapor (as a so-called metal vapor plume). There is thereby produced a so-called thermal lens which is unfavorable for the quality of the laser processing operation of the workpiece 5 as its changes significantly both in terms of time and location. This thermal lens produces, for example, irregular upper seam beads and weld splashes.

To counteract this effect, the laser processing head 1 introduces an auxiliary gas (indicated in FIG. 1 by arrows 6) into a (processing) region 7 which surrounds the processing zone 4 of the workpiece 5, an annular nozzle 9 which is arranged coaxially with respect to the laser beam axis 8. Using the annular nozzle 9, the auxiliary gas 6 can be directed into the processing region 7 (e.g., into the region around the laser beam 3 or into it) to displace a metal vapor plume or metal vapor is displaced out of the processing region 7 and prevent it from being introduced into the space through which the laser beam 3 passes. The formation of the thermal lens with the disadvantageous consequences thereof can be prevented or at least weakened. To distribute or introduce the auxiliary gas 6 into the processing region 7, the annular nozzle 9 has a plurality of outlet openings 10, two of which are illustrated in FIG. 1 by way of example.

Figure 2A:
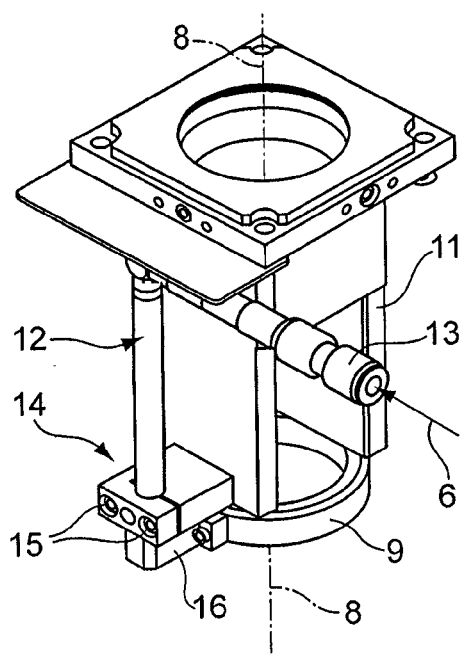
FIGS. 2a and 2b are schematics that show a housing portion of the laser processing head from FIG. 1 with an annular nozzle in a first position in abutment with the laser processing head, and in a second position spaced from the laser processing head.
Figure 2B:
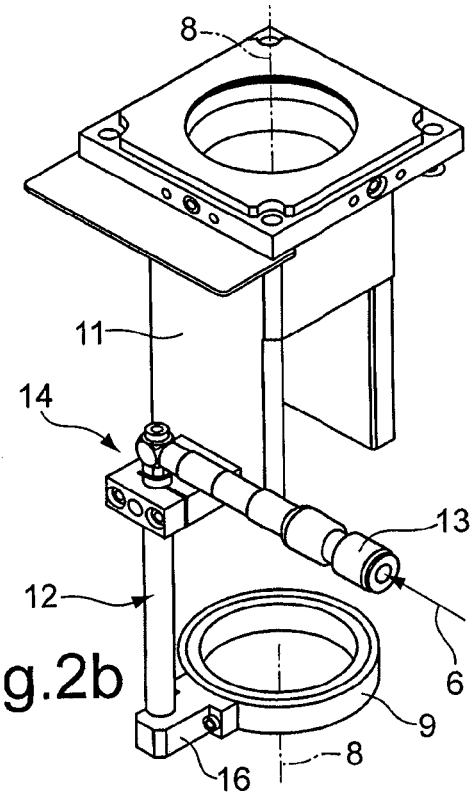

FIGS. 2a and 2b show a housing portion 11 of the laser processing head 1 of FIG. 1 and the annular nozzle 9. For simplification, the illustration of the optical focusing unit 2 and the focused laser beam 3 has been omitted. The annular nozzle 9 is mounted so as to be displaceable along the laser beam axis 8 on the housing portion 11 of the laser processing head 1. The annular nozzle 9 is shown in FIG. 2a in a first (upper) position in which it is in abutment with the lower end of the housing portion 11 which forms a first end stop for the annular nozzle 9. FIG. 2b shows the annular nozzle 9 in a second (lower) position in which the annular nozzle 9 is spaced apart from the housing portion 11. The annular nozzle 9 can be arranged on the housing portion 11 in additional positions which are located between the upper and the lower position along the laser beam axis 8 and can be secured at that location in each case.

A tubular portion 12 of an auxiliary gas supply line 13, which can be connected to an auxiliary gas source or production device (not shown), can displaceably support the annular nozzle 9 on the housing portion 11. Via the tubular (rigid) portion 12 of the supply line 13, the auxiliary gas 6 can be directed into the annular nozzle 9, which is rigidly connected to the tubular portion 12. The tubular portion 12 of the supply line 13 is displaceably supported on the housing portion 11.

A clamping device 14 is on the housing portion 11 of the laser processing head 1 for securing the tubular portion 12 in a clamped manner. The clamping device 14 has in FIGS. 2a and 2b a hole whose diameter can be changed by the screwing or unscrewing of clamping screws 15 for receiving the tubular portion 12. If the diameter is accordingly reduced, the friction between the receiving member or hole of the clamping device 14 and the tubular portion 12 is sufficiently large for a securing of the tubular portion 12 and the annular nozzle 9 to the housing portion 11 to be carried out.

The annular nozzle 9 is connected to the tubular portion 12 in a rigid manner by an adapter 16, the adapter 16 having at the inner side a recess through which the auxiliary gas 6 is directed out of the tubular portion 12 into the annular nozzle 9. The auxiliary gas 6 may be air or other gases. For example, auxiliary gas 6 may be an inert gas such as nitrogen.

Figure 3:
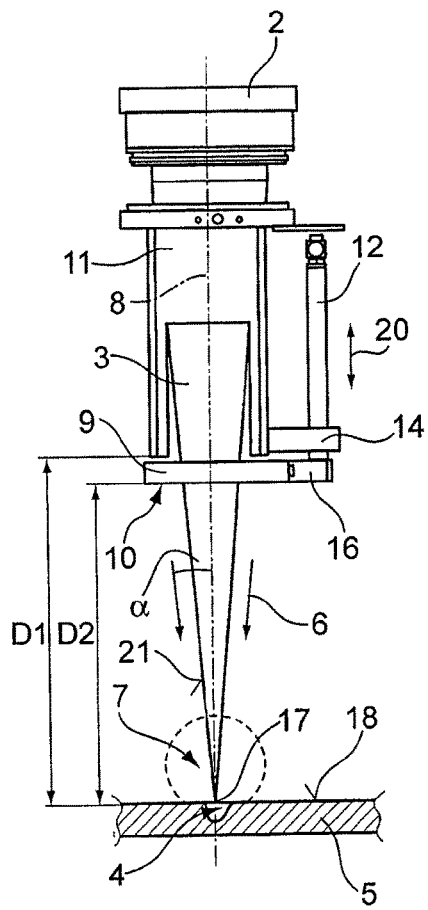
FIG. 3 is a side view of the housing portion from FIGS. 2a, b and a laser beam which is focused on a processing zone of a workpiece.

FIG. 3 shows the optical focusing unit 2, the housing portion 11, the clamping device 14, the annular nozzle 9, the adapter 16, and the tubular portion 12 in a side view over the workpiece 5. Owing to the optical focusing unit 2 the laser beam 3 is focused on the processing zone 4 of the workpiece 5 at a focal point 17. In this instance, the laser beam 3 passes at least partially through the processing region 7 which surrounds the processing zone 4 of the workpiece 5. The processing region 7 is a spatial region which extends from the upper workpiece side 18 in the direction towards the laser processing head 1.

The laser processing head 1 (specifically the free end of the housing portion 11 of the laser processing head 1) is at an operating distance D1 to the workpiece upper side 18 during the laser processing operation of the workpiece 5. In FIG. 3, the annular nozzle 9 is illustrated at a short distance from the upper position (as opposed to in FIG. 2a where it is in direct abutment). In this instance the annular nozzle 9, in particular an end face of the annular nozzle 9, in which the plurality of outlet openings 10 are arranged, is spaced at distance D2 from the workpiece upper side 18. If the operating spacing D1 corresponding to the respective processing situation is known (for example, the thickness of the workpiece 5 to be processed, the laser beam intensity or the focal point, etc.) the distance D2 between the annular nozzle 9 and the workpiece 5 can be adjusted by corresponding handling of the clamping device 14 and the tubular portion 12 (by displacing the tubular portion 12 in a parallel direction 20 with respect to the laser beam axis 8).

The plurality of outlet openings 10 of the annular nozzle 9 is constructed in such a manner that the auxiliary gas 6 is discharged at an (acute) angle α with respect to the laser beam axis 8 and in the present example extends substantially parallel to a covering face 21 of the conical focused laser beam 3, that is to say, the half opening angle of the focused laser beam 3 substantially corresponds to the acute angle α. In this manner, the region into which rising metal vapors can be introduced or in which the metal vapor plume is formed can be limited to a region 7 close to the workpiece. Such a substantially parallel orientation is also advantageous since, in this instance, only a small proportion of the auxiliary gas 6 reaches the region of the processing zone 4, so that oil-free compressed air can be used as auxiliary gas 6. However, in the event that a substantially oxide-free melt is desired, a protective cover which is close to the process can be produced using conventional inert gases. Such a protective cover may be produced by the auxiliary gas 6 provided by the annular nozzle 9 or where applicable by additional supply devices for supplying auxiliary gases to the processing zone 4.

If the annular nozzle 9 or the laser processing head 1 is arranged at a comparatively large distance from the upper workpiece side 18, for example, directly below a cross jet (not shown), the auxiliary gas flows 6 which are indicated by the arrows 6 and which pass through the individual outlet openings 10 are combined above the upper workpiece side 18. The metal vapor plume is in this position substantially displaced and it is, for example, approximately 10 mm above the processing zone 4. In this instance, almost the entire region between the workpiece 5 and annular nozzle 9 is particle-free.

If the annular nozzle 9 is arranged at a smaller distance with respect to the upper workpiece side 18, for example, as shown in FIG. 3, the volume flows 6 are combined at the upper workpiece side 18. In this position or at this spacing, the volume flow is minimal, but the interference contour has increased with respect to the previous position. In the position shown in FIG. 3, the auxiliary gas consumption or the complexity for producing and providing the auxiliary gas 6 can be significantly reduced. However, the action of the auxiliary gas 6 to displace the metal vapor is advantageously present both with relatively large and minimum volume flows.

If the spacing of the annular nozzle 9 with respect to the workpiece surface 18 is further reduced, the volume flows 6 strike the upper workpiece side 18 individually, that is to say, the intersection location thereof would be located below the workpiece surface 18. In this instance, the metal vapor plume is displaced only insufficiently. However, the selection of another (larger) angle α can result in the volume flows 6 being combined above the upper workpiece side 18 even with such a comparatively small spacing D2 from the workpiece 5. Typical values for the volume flows which are supplied to the gas nozzle 9 are approximately from 20 L/min to approximately 60 L/min. The flow speed of the auxiliary gas 6 may, for example, be between approximately 4 and 12 L/min. which, for example, leads to a pressure increase in the capillary formed in the processing zone of only approximately 1 mbar. This very small pressure increase shows that the auxiliary gas 6 is not blown into the capillary.

Figure 4:
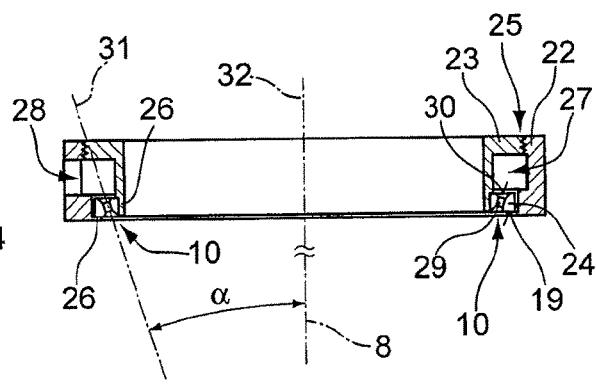
FIG. 4 is a cross-section through an embodiment of the annular nozzle.

FIG. 4 is a cross-section of the annular nozzle 9 for the laser processing head 1. The annular nozzle 9 comprises a first substantially radially outer annular portion 22, and a second substantially radially inner annular portion 23 and a changing ring 24. The first annular portion 22 and the second annular portion 23 are releasably connected to each other by a screw connection 25. On the first and second annular portions 22, 23 are receiving members 26 for the changing ring 24 so that it can be inserted in a gas-tight manner between the first and second annular portion 22, 23 and can be secured between them during the screwing operation.

The first annular portion 22, the second annular portion 23 and the changing ring 24 together delimit an annular gas distribution chamber 27, there being formed to connect the supply line 13 for the auxiliary gas 6 (for example, to connect the adapter 16) on the first annular portion 22 a lateral inlet opening 28 which opens into the gas distribution chamber 27. There is further formed on the changing ring 24 the plurality of outlet openings 10 for the auxiliary gas 6, the outlet openings 10 opening at the axial outer side 19 of the changing ring 24. The outlet openings 10 in the changing ring 24 have in the present example a varying flow cross-section 29 which extends from an axial inner side 30 of the changing ring 24 as far as the axial outer side 19 of the changing ring 24. The longitudinal axes 31 of the outlet openings 10 are oriented at the acute angle α with respect to the rotation axis 32 of the annular nozzle 9 or the laser beam axis 8. The longitudinal axes of the outlet openings 10 of different changing rings 24 may assume different angles α with respect to the rotation axis 32 of the annular nozzle 9. In this manner, the volume flow through the annular nozzle 9 can advantageously be minimized in dependence of the operating spacing D1.

Figure 5:
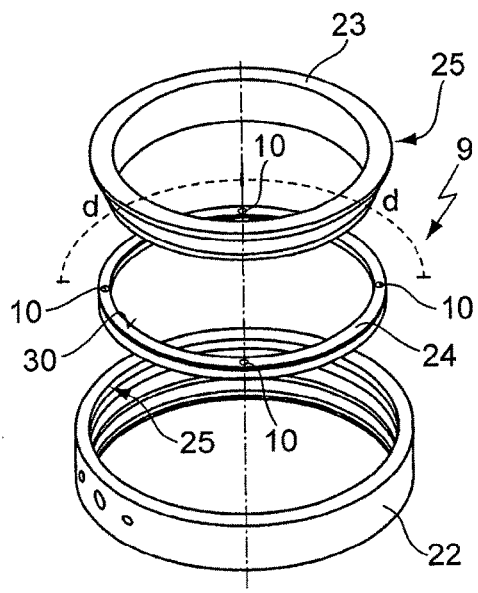
FIG. 5 is an exploded view of the annular nozzle of FIG. 4.

FIG. 5 is an exploded view of the annular nozzle 9 of FIG. 4. The axial inner side 30 of the changing ring 24 has four outlet openings 10 which are arranged with regular spacing d in a peripheral direction on the changing ring 24 and which are oriented with respect to a common location on the laser beam axis 8. Such an arrangement enables particularly uniform displacement of the metal vapor plume.

The three-part nature of the annular nozzle 9 allows it to be disassembled and reassembled again in a particularly simple manner. The changing ring 24 typically has the greatest tendency to become contaminated by the metal vapor plume or the metal splashes, and can be replaced, exchanged or cleaned in a particularly simple manner, since only the screw connection 25 between the first and the second annular portion 22, 23 has to be released.

The easy and simple access to the changing ring 24 enables the rapid replacement of a large number of different changing rings 24 each having different properties. For example, different (acute) angles α of the outlet openings 10 can be chosen depending on which opening angle the conical covering face 21 which delimits the laser beam 3 has in a respective processing situation or the distance of annular nozzle 9 from the workpiece surface 18. A changing ring 24 having a completely or partially peripheral annular gap (with, for example, approximately from 0.02 to 0.03 mm gap diameter) as an outlet opening 10 is also possible. With a fully peripheral annular gap, thin connection webs are typically in the annular gap to hold the changing ring 24 together.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:
1. A laser processing head comprising:
an optical focusing unit for focusing a laser beam on a processing zone of a workpiece; and
an annular nozzle arranged coaxially with respect to a central axis of the laser beam for introducing an auxiliary gas into a region surrounding the processing zone,
wherein the annular nozzle is mounted on the laser processing head so as to be displaceable along the laser beam axis and can be secured to the laser processing head in different positions along the laser beam axis, wherein the annular nozzle is rigidly connected to a tubular portion of a supply line for the auxiliary gas and the tubular portion is displaceably mounted on the laser processing head, and wherein the tubular portion extends along the laser beam axis.

2. The laser processing head according to claim 1, further comprising a clamping device for securing the tubular portion to the laser processing head in a clamped manner.

3. The laser processing head according to claim 1, wherein the annular nozzle comprises at least one outlet opening that is oriented at an acute angle relative to the laser beam axis.

4. The laser processing head according to claim 1, wherein the annular nozzle comprises a plurality of outlet openings that are each oriented at an acute angle relative to the laser beam axis.

5. The laser processing head according to claim 1, wherein the annular nozzle comprises a first annular portion, a second annular portion, and a changing ring, which are releasably connected to each other and which together delimit an annular gas distribution chamber.

6. The annular nozzle according to claim 5, wherein the changing ring comprises a plurality of outlet openings for the auxiliary gas.

7. The annular nozzle according to claim 6, wherein the plurality of outlet openings are arranged with uniform spacing intervals between them.

8. The annular nozzle according to claim 6, wherein at least one outlet opening has a varying flow cross-section.

9. An annular nozzle for a laser processing head for introducing an auxiliary gas into a region surrounding a processing zone of a workpiece, the annular nozzle comprising:
a first substantially radially outer annular ring, a second substantially radially inner annular ring, and a changing ring arranged between the first annular ring and the second annular ring, which are releasably connected to each other and which together delimit an annular gas distribution chamber,
wherein the first annular ring has a lateral inlet opening that opens to the gas distribution chamber to connect a supply line for the auxiliary gas and wherein the changing ring has at least one outlet opening for the auxiliary gas at an angle with respect to a laser beam axis, wherein the first and second annular rings have receiving surfaces for radially inserting the changing ring between the receiving surfaces of the first and second annular rings in a gas-tight assembly.

10. The annular nozzle according to claim 9, wherein the changing ring has a plurality of outlet openings for the auxiliary gas.

11. The annular nozzle according to claim 10, wherein the plurality of outlet openings are arranged with uniform spacing intervals between them.

12. The annular nozzle according to claim 9, wherein at least one outlet opening has a varying flow cross-section.

13. The annular nozzle according to claim 9, wherein a longitudinal axis of the at least one outlet opening is oriented at an acute angle with respect to a rotation axis of the annular nozzle.

14. The annular nozzle according to claim 9, wherein the first annular ring and the second annular ring comprise a threading that enables these elements to be screwed to each other.

15. The annular nozzle according to claim 9, wherein the at least one outlet opening of the changing ring extends from an axial inner side of the changing ring as far as an axial outer side of the changing ring.

* * * * *